(12) United States Patent
Singhal et al.

(10) Patent No.: US 12,071,858 B2
(45) Date of Patent: Aug. 27, 2024

(54) FIRE RETARDANT ENGINE CASING APPARATUS

(71) Applicant: GENERAL ELECTRIC COMPANY, Schenectady, NY (US)

(72) Inventors: Manish Singhal, Bengaluru (IN); Vishnu Das K, Bengaluru (IN); Sagar Pradhan, Bengaluru (IN); Ravindra Shankar Ganiger, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/543,347

(22) Filed: Dec. 6, 2021

(65) Prior Publication Data

US 2023/0111191 A1    Apr. 13, 2023

(30) Foreign Application Priority Data

Oct. 13, 2021   (IN) .............................. 202111046647

(51) Int. Cl.
*F01D 25/24* (2006.01)
*F01D 5/28* (2006.01)
(Continued)

(52) U.S. Cl.
CPC .............. *F01D 25/24* (2013.01); *F01D 5/28* (2013.01); *F01D 25/005* (2013.01); *F02C 7/25* (2013.01); *F05D 2230/31* (2013.01); *F05D 2230/90* (2013.01); *F05D 2240/14* (2013.01); *F05D 2250/283* (2013.01); *F05D 2300/133* (2013.01)

(58) Field of Classification Search
CPC .......... F01D 25/24; F01D 25/005; F01D 5/28; F02C 7/25; F05D 2230/31; F05D 2230/90; F05D 2240/14; F05D 2250/283; F05D 2300/133; F05D 2300/44; F05D 2300/612
See application file for complete search history.

(56) References Cited

U.S. PATENT DOCUMENTS 2,480,369 A    8/1949  Jasper
2,710,523 A  * 6/1955  Purvis ..................... F01D 25/30
                                                              60/770
(Continued)

FOREIGN PATENT DOCUMENTS

CN    102795351 A  * 11/2012  ............. F01D 25/00
CN    213919982 U  *  8/2021
(Continued)

OTHER PUBLICATIONS

Palacios et al. Self-Forming 3D Core-Shell Ceramic Nanostructures for Halogen Free Flame Retardant Materials, Aug. 2016, ACS Applied Materials & Interfaces, ACS Appl. Mater. Interfaces 2016, 8, 9462-9471 (Year: 2016).*
(Continued)

*Primary Examiner* — David E Sosnowski
*Assistant Examiner* — Wayne A Lambert
(74) *Attorney, Agent, or Firm* — HANLEY, FLIGHT & ZIMMERMAN, LLC

(57) ABSTRACT

Fire retardant engine casing apparatus are disclosed. An example engine casing includes an inner shell circumferentially surrounding blades of a fan, a compressor, or a turbine, an outer shell positioned around the inner shell, and a fire retardant material between the inner shell and the outer shell.

19 Claims, 8 Drawing Sheets

(51) Int. Cl.
*F01D 25/00* (2006.01)
*F02C 7/25* (2006.01)

(56) References Cited

U.S. PATENT DOCUMENTS

| | | | |
|---|---|---|---|
| 3,512,675 A | 5/1970 | Pennell | |
| 4,199,300 A * | 4/1980 | Tubbs | F01D 11/18 415/173.1 |
| 4,299,872 A * | 11/1981 | Miguel | B32B 3/12 260/DIG. 24 |
| 4,642,027 A * | 2/1987 | Popp | F01D 25/08 165/47 |
| 4,659,282 A * | 4/1987 | Popp | F01D 25/08 165/47 |
| 5,921,751 A * | 7/1999 | Freling | F01D 21/045 415/177 |
| 5,952,248 A * | 9/1999 | Horton | E04B 1/88 442/388 |
| 6,855,393 B1 * | 2/2005 | Ayres | B32B 15/08 428/116 |
| 8,695,720 B2 * | 4/2014 | Mickelsen | F02C 7/25 428/920 |
| 9,427,772 B2 | 8/2016 | Schoke | |
| 9,752,450 B2 * | 9/2017 | Duguay | F01D 11/22 |
| 10,065,370 B2 | 9/2018 | Lyons et al. | |
| 10,830,201 B2 | 11/2020 | Michels et al. | |
| 2005/0281999 A1 | 12/2005 | Hofmann et al. | |
| 2012/0324906 A1 * | 12/2012 | Groom | F02C 7/25 428/156 |
| 2013/0000324 A1 * | 1/2013 | Alvanos | F01D 9/044 60/805 |
| 2014/0202170 A1 * | 7/2014 | Cook, III | B32B 27/281 427/404 |
| 2014/0212273 A1 * | 7/2014 | Le Borgne | F01D 25/24 415/200 |
| 2017/0045059 A1 * | 2/2017 | Care | F04D 29/526 |
| 2019/0030880 A1 | 1/2019 | Birger et al. | |
| 2020/0071480 A1 | 3/2020 | Zander et al. | |
| 2020/0109668 A1 | 4/2020 | Butcher et al. | |
| 2020/0165937 A1 * | 5/2020 | Donisi | F01D 21/045 |

FOREIGN PATENT DOCUMENTS

| | | | | |
|---|---|---|---|---|
| FR | 2315580 A1 | | 1/1977 | |
| FR | 2978076 A1 * | | 1/2013 | C23C 24/04 |
| FR | 2978987 A1 * | | 2/2013 | B22F 3/15 |
| FR | 3027959 A1 * | | 5/2016 | F01D 25/24 |
| FR | 3055820 A1 * | | 3/2018 | B23K 26/08 |
| GB | 2174335 A * | | 11/1986 | B29D 99/0021 |
| JP | 2018103451 A * | | 7/2018 | |

OTHER PUBLICATIONS

Chen et al. CN 213919982 English Machine Translation, translated on Nov. 2, 2022 (Year: 2020).*

Courapied et al. FR 3027959 English Machine Translation, translated by EPO on Oct. 26, 2022 (Year: 2014).*

Ferrer FR 2978076 English Machine Translation, translated by EPO Oct. 26, 2022 (Year: 2013).*

Nakama et al. JP 20181033451 English Machine Translation, translated on Oct. 31, 2022 (Year: 2018).*

Franchet et al. FR_2978987 A1 English Machine Translation, translated by EPO on Oct. 25, 2022 (Year: 2013).*

Jihlein et al., "Titanium Fire in Jet Engines," Daimeter-Benz Aerospace, MTU Motoren-und Turbinen-Union Munchen GmbH, pp. 1-12.

* cited by examiner

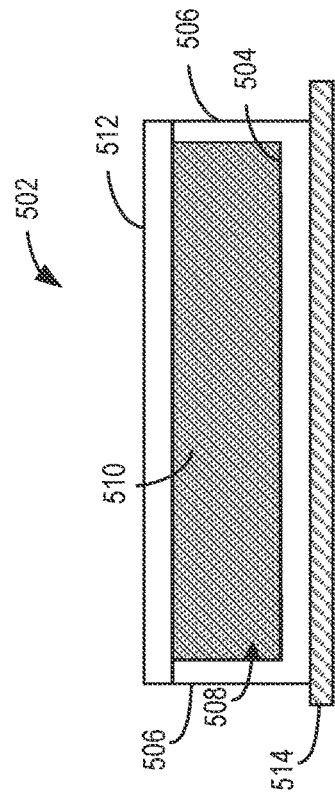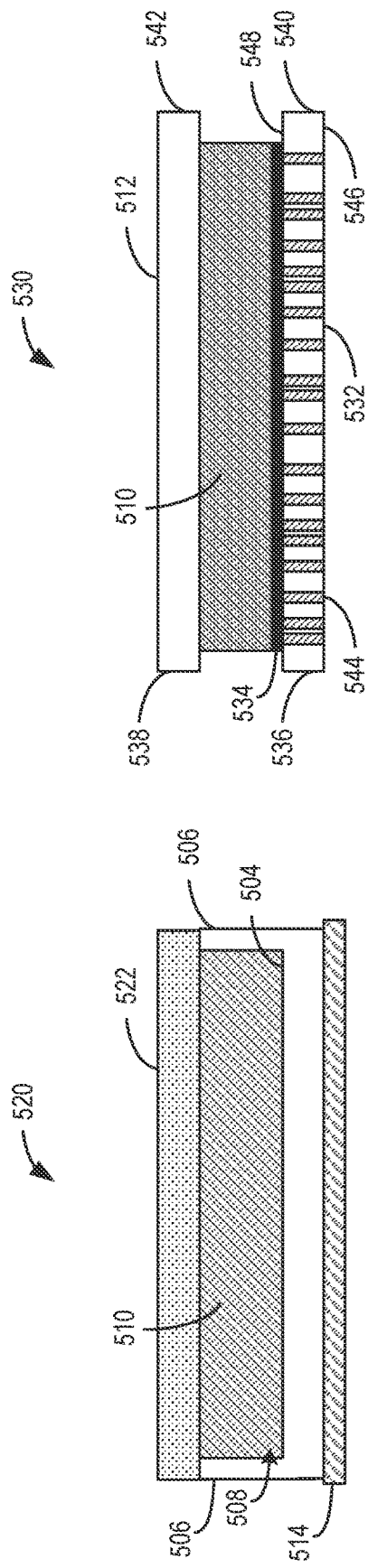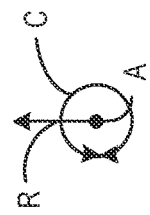

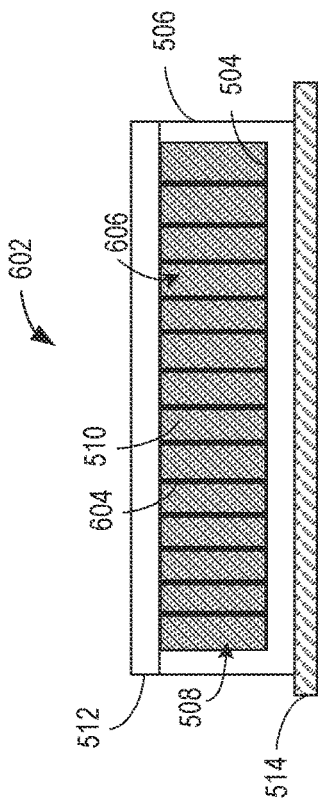
FIG. 6A
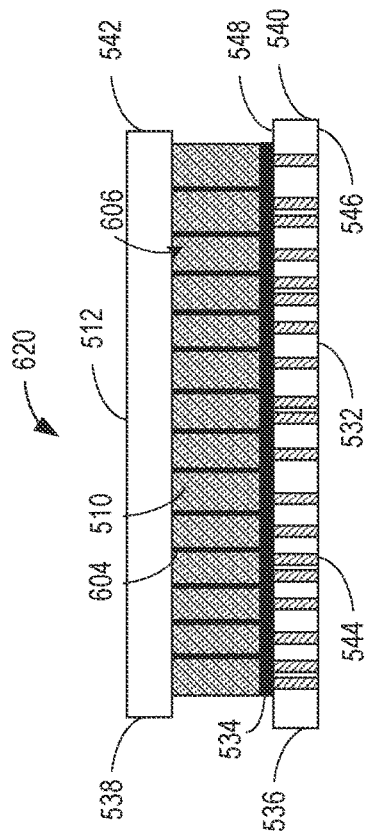
FIG. 6C
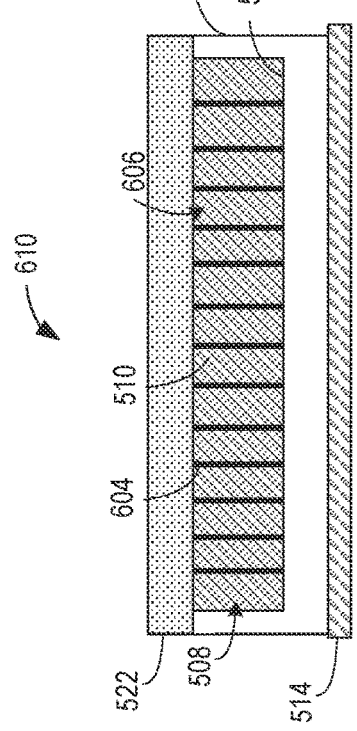
FIG. 6B
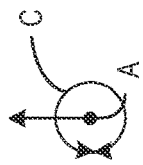

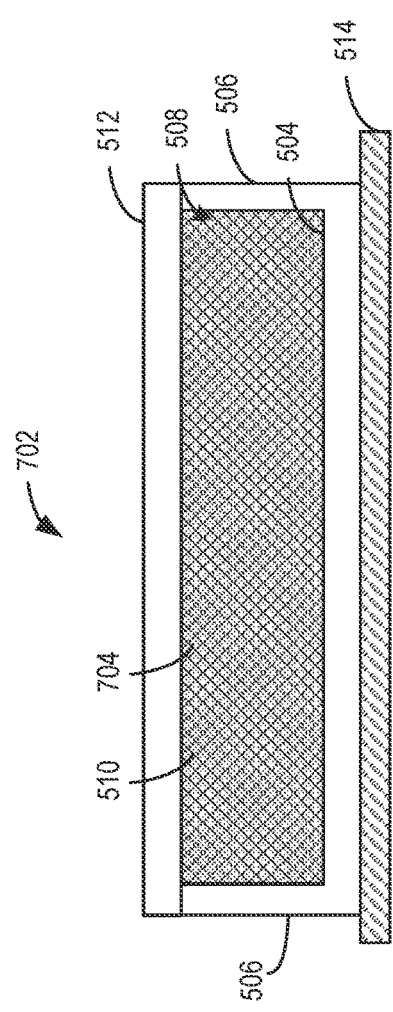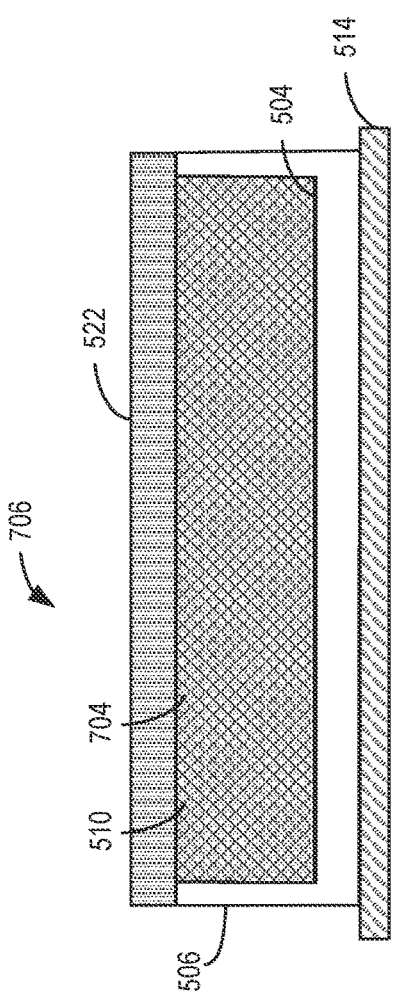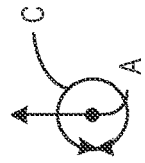

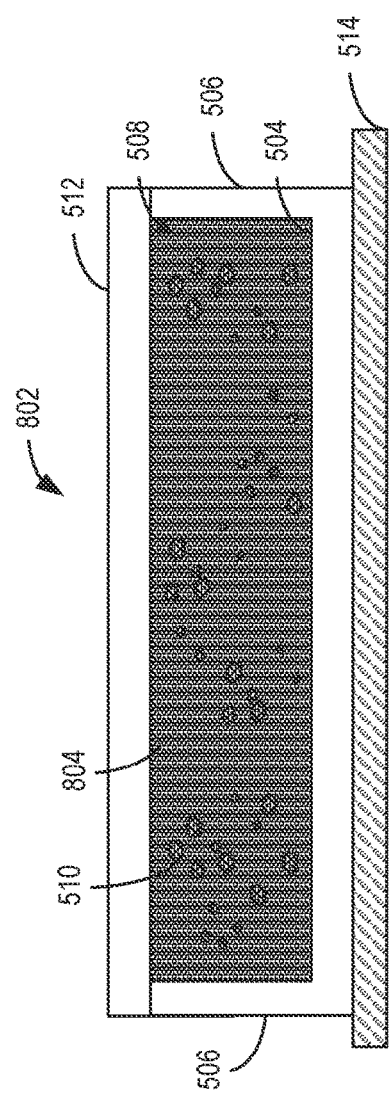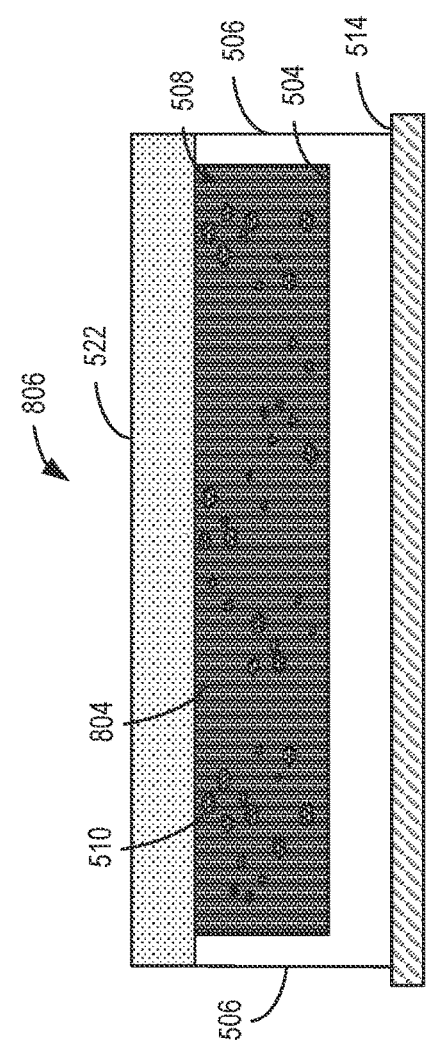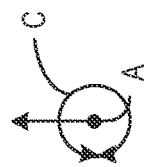
FIG. 8A
FIG. 8B

FIRE RETARDANT ENGINE CASING APPARATUS

RELATED APPLICATION

This patent claims the benefit of Indian Provisional Patent Application No. 202111046647, which was filed on Oct. 13, 2021. Indian Provisional Patent Application No. 202111046647 is hereby incorporated herein by reference in its entirety. Priority to Indian Provisional Patent Application No. 202111046647 is hereby claimed.

FIELD OF THE DISCLOSURE

This disclosure relates generally to turbofan engines and, more particularly, to fire retardant engine casing apparatus.

BACKGROUND

In recent years, titanium based alloys have been utilized for blades, casings, and/or disks in turbofan engines because of a low density and high strength-to-weight ratio compared to steel. As such, titanium enables greater thrust-to-weight ratios in turbofan engines than other metals. However, despite a higher melting point, most titanium alloys have a lower temperature resistance than steel or nickel alloys, which, accompanied with the ignitability of titanium alloys and the exothermic reaction with oxygen, can result in a titanium fire under certain conditions. Accordingly, steel or nickel alloys are often utilized in hotter areas of the engine.

BRIEF DESCRIPTION OF THE DRAWINGS

FIG. 5A illustrates a first example implementation of the fire retardant engine casing apparatus of FIG. 4.

FIG. 5B illustrates a second example implementation of the fire retardant engine casing apparatus of FIG. 4.

FIG. 5C illustrates a third example implementation of the fire retardant engine casing apparatus of FIG. 4.

FIG. 6A illustrates a fourth example implementation of the fire retardant engine casing apparatus of FIG. 4.

FIG. 6B illustrates a fifth example implementation of the fire retardant engine casing apparatus of FIG. 4.

FIG. 6C illustrates a sixth example implementation of the fire retardant engine casing apparatus of FIG. 4.

FIG. 7A illustrates a seventh example implementation of the fire retardant engine casing apparatus of FIG. 4.

FIG. 7B illustrates an eighth example implementation of the fire retardant engine casing apparatus of FIG. 4.

FIG. 8A illustrates a ninth example implementation of the fire retardant engine casing apparatus of FIG. 4.

FIG. 8B illustrates a tenth example implementation of the fire retardant engine casing apparatus of FIG. 4.

The figures are not to scale. In general, the same reference numbers will be used throughout the drawing(s) and accompanying written description to refer to the same or like parts.

DETAILED DESCRIPTION

Figure 1:
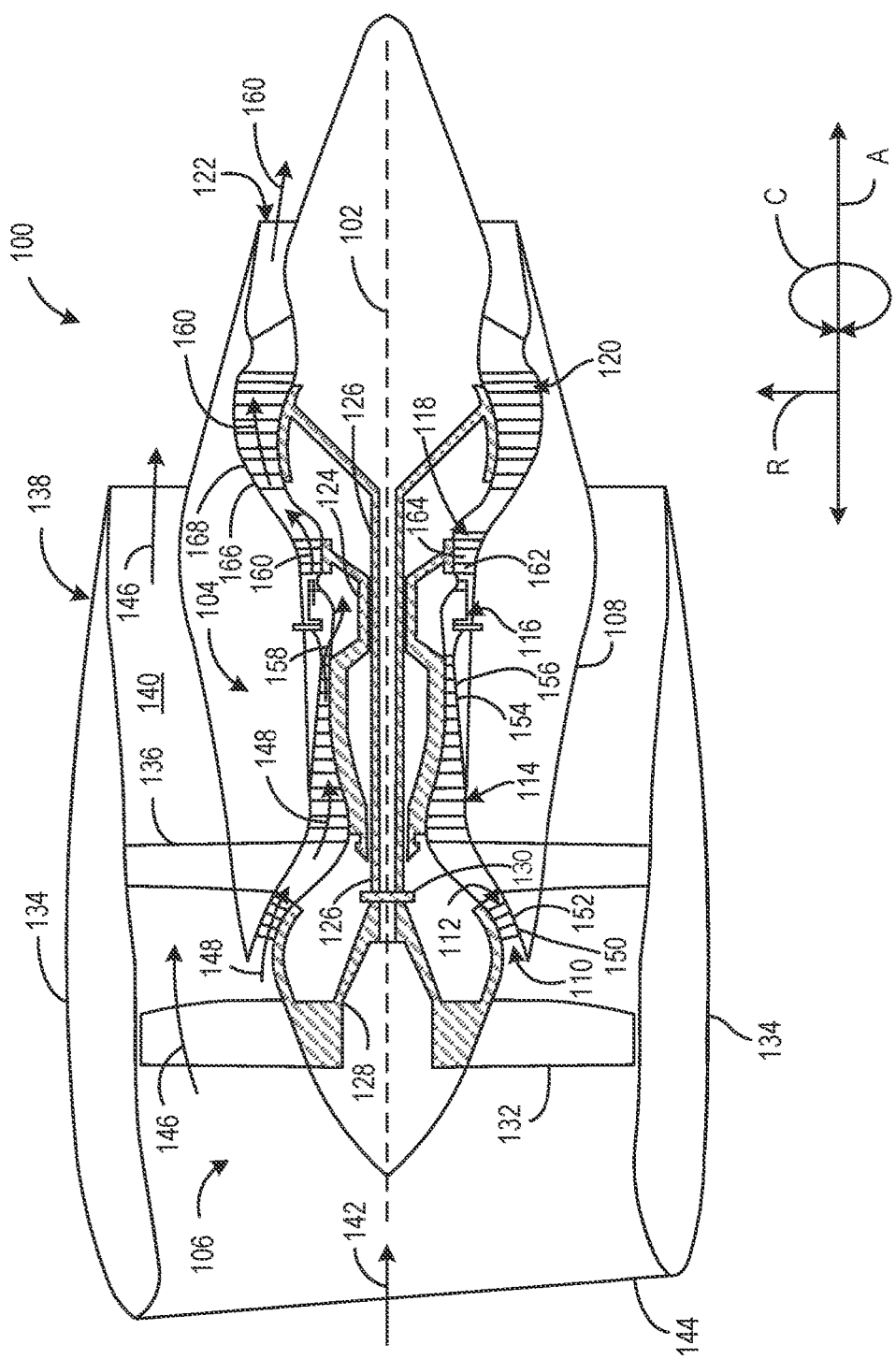
FIG. 1 illustrates a schematic cross-sectional view of a prior art example of a turbofan engine.

Although titanium includes favorable characteristics for utilization in turbofan engines, such as a high strength to weight ratio, titanium alloys that are utilized in blades, casings, and/or discs of turbofan engines, are susceptible to fire (e.g., titanium fire). For instance, oxygen and heat, which can result from friction against the titanium surface, can cause titanium to ignite.

In some examples, titanium fire can occur as a result of friction between adjacent titanium blades and/or between titanium blades and a surrounding casing as the heat generated from friction can exceed the relative ignition temperature of titanium alloys. In some examples, when a fragment of a titanium blade impinges against a casing, the fragment can burn through and ignite the casing. Accordingly, when turbofan engines include titanium blades and/or casings, more clearance space is incorporated between adjacent blades and/or between blade tips and the casing to reduce friction and, thus, a likelihood of titanium fire occurring.

Damages that result from a titanium fire are most severe when the fire breaches an outer layer of the casing causing damage to engine support structures and/or other airframe structures. In some examples, a thicker casing is utilized to prevent the titanium fire from breaching the casing. However, the thicker casing increases the weight of the aircraft, which increases a size and/or quantity of support structures associated with the engine. As such, the increased weight reduces a specific fuel consumption efficiency of the aircraft. Additionally, tight manufacturing tolerances are needed to obtain thrust while preventing too much friction from occurring between the blades and the casing that would otherwise cause ignition.

Examples disclosed herein provide fire retardant engine casing apparatus. In certain examples, a casing of an aircraft engine (e.g., a turbofan engine, an axial flow engine, etc.) includes an inner shell, an outer shell, and a cavity or chamber including a fire retardant material (e.g., a fire retardant filler) between the inner shell and the outer shell. The casing circumferentially surrounds at least a portion of a fan section, a compressor section, a combustor section, and/or a turbine section of the aircraft engine. As such, the inner shell at least partially defines a flow path within the aircraft engine and, thus, can separate the fire retardant material from air that moves through the aircraft engine. In some examples, the fan section, the compressor section, and/or the turbine section include titanium blades and, thus, the inner shell is at least partially positioned around titanium blades.

In some examples, when a fire breaches the inner shell, the fire retardant material can contain the fire to minimize or otherwise reduce damage encountered in response to the fire occurring. For example, a high temperature resistance of the fire retardant material can prevent the fire from affecting and/or breaching the outer shell. In some examples, the fire retardant material depletes a concentration of oxygen between the inner shell and the outer shell in response to encountering the fire and, thus, prevents the fire from burning. For example, the fire retardant material can release an inert gas in response to encountering the fire to deplete the concentration of oxygen. Additionally or alternatively, the fire retardant material can oxidize and absorb oxygen in response to encountering the fire to deplete the concentration of oxygen.

In some examples, the fire retardant material delays a spread of the fire in response to the fire breaching the inner shell, which enables timely action to be taken, if necessary. In such examples, the delay of the spread of the fire caused by the fire retardant material can provide time for a sensor within the turbofan engine to detect that the fire has ignited. In turn, a full authority digital engine control (FADEC) associated with the aircraft engine can implement a remediating action and/or relay such information to an operator that can recognize that the fire has ignited and shut down the engine in advance of the fire breaching the outer shell and/or causing further deterioration.

As such, the fire retardant material reduces a susceptibility of the turbofan engine to titanium fires. Advantageously, the fire retardant material enables the casing to provide fire containment with a reduced thickness and a reduced weight. Additionally, the fire retardant material within the cavity enables the casing to withstand more friction without a hazardous ignition occurring (e.g., an ignition that causes a fire to breach the outer shell) and, thus, enables the aircraft engine to have a reduced clearance between blade tips and the inner shell. In turn, the reduced clearance between the inner shell and the blade tips can improve a thrust created by the turbofan engine. Moreover, the blades can have a larger manufacturing tolerance and, thus, a reduced cost as a result of the blade tips being able to be positioned closer to the inner shell of the casing without hazardous risks.

In certain examples, the fire retardant material is a composite metal foam, a porous casting, a gel, a powder, and/or a coating on the inner shell and/or the outer shell. In some examples, the fire retardant material is an ultra-high-temperature ceramic, such as zirconium carbide, zirconium boride, zirconium diboride, hafnium carbide, hafnium diboride, titanium carbide, and/or silicon carbide. In some examples, the fire retardant material includes layered double hydroxide based nanocomposites, a graphene and layered double hydroxide hybrid nanocomposite, and/or ceramic nanostructures having graphene oxide layers. In some examples, the layered double hydroxide is an epoxy resin that enables the fire retardant material to bond to a surface.

In some examples, an internal structure is positioned within the cavity or chamber and coupled to the inner shell and the outer shell. In some examples, the fire retardant material is an injected coating on the internal structure. In some examples, the internal structure is a honeycomb structure fixed to the inner shell and the outer shell. In some examples, the fire retardant material is positioned within cells defined by the honeycomb structure. In some examples, the internal structure is a lattice structure and/or a metal sponge fixed to the inner shell and the outer shell. In some examples, the fire retardant material is disposed around the lattice structure or the metal sponge. For example, the fire retardant material can enmesh (e.g., entangle, intertwine, etc.) with the lattice structure or the metal sponge.

Accordingly, the internal structure can fill a first volumetric portion of the cavity and the fire retardant material can fill a second volumetric portion of the cavity separate from the first volumetric portion. In some examples, a volumetric ratio of the internal structure relative to the fire retardant material is based on an area of the turbofan engine, an area of implementation of the casing within the turbofan engine, and/or a size of the turbofan engine. For example, the volumetric ratio of the fire retardant material can be larger in hotter areas of the engine, such as the combustor or turbine. The internal structure and the fire retardant material can each define between 10% and 90% of a volume between the inner shell and the outer shell. In some examples, the internal structure occupies 60-80% of the volume between the inner shell and the outer shell and the fire retardant material occupies 20-40% of the volume between the inner shell and the outer shell.

Referring now to the drawings, FIG. 1 is a schematic cross-sectional view of a prior art example of a turbofan engine 100 that may incorporate various examples disclosed herein. As shown in FIG. 1, the turbofan engine 100 defines a longitudinal or axial centerline axis 102 extending therethrough for reference. In general, the turbofan engine 100 can include a core turbine or a core turbine engine 104 disposed downstream from a fan section 106.

The core turbine engine 104 can generally include a substantially tubular outer casing 108 that defines an annular inlet 110. The outer casing 108 can be formed from multiple solid segments. The outer casing 108 encloses, in serial flow relationship, a compressor section having a booster or low-pressure compressor 112 ("LP compressor 112") and a high-pressure compressor 114 ("HP compressor 114"), a combustion section 116, a turbine section having a high-pressure turbine 118 ("HP turbine 118") and a low-pressure turbine 120 ("LP turbine 120"), and an exhaust section 122. A high-pressure shaft or spool 124 ("HP shaft 124") drivingly couples the HP turbine 118 and the HP compressor 114. A low-pressure shaft or spool 126 ("LP shaft 126") drivingly couples the LP turbine 120 and the LP compressor 112. The LP shaft 126 can also couple to a fan shaft or spool 128 of the fan section 106. In some examples, the LP shaft 126 can couple directly to the fan shaft 128 (i.e., a direct-drive configuration). In alternative configurations, the LP shaft 126 may couple to the fan shaft 128 via a reduction gearbox 130 (i.e., an indirect-drive or geared-drive configuration).

As shown in FIG. 1, the fan section 106 includes a plurality of fan blades 132 ("fan" 132) coupled to and extending radially outwardly from the fan shaft 128. An annular fan casing or nacelle 134 circumferentially encloses the fan section 106 and/or at least a portion of the core turbine engine 104. The nacelle 134 can be supported relative to the core turbine engine 104 by a forward mount 136. Furthermore, a downstream section 138 of the nacelle 134 can enclose an outer portion of the core turbine engine 104 to define a bypass airflow passage 140 therebetween.

As illustrated in FIG. 1, air 142 enters an intake or inlet portion 144 of the turbofan engine 100 during operation thereof. A first portion 146 of the air 142 flows into the bypass airflow passage 140, while a second portion 148 of the air 142 flows into the annular inlet 110 of the LP compressor 112. One or more sequential stages of LP compressor stator vanes 150 and LP compressor rotor blades 152 (e.g., turbine blades) coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 where one or more sequential stages of HP turbine stator vanes 162 and HP turbine rotor blades 164 coupled to the HP shaft 124 extract a first portion of kinetic and/or thermal energy therefrom. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine engine 104 through the exhaust section 122 thereof.

Along with the turbofan engine 100, the core turbine engine 104 serves a similar purpose and sees a similar environment in land-based turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) can be included between any shafts and spools. For example, the reduction gearbox 130 can be disposed between the LP shaft 126 and the fan shaft 128 of the fan section 106.

As depicted therein, the turbofan engine 100 defines an axial direction A, a radial direction R, and a circumferential direction C. In general, the axial direction A extends generally parallel to the axial centerline axis 102, the radial direction R extends orthogonally outward from the axial centerline axis 102, and the circumferential direction C extends concentrically around the axial centerline axis 102.

Figure 2:
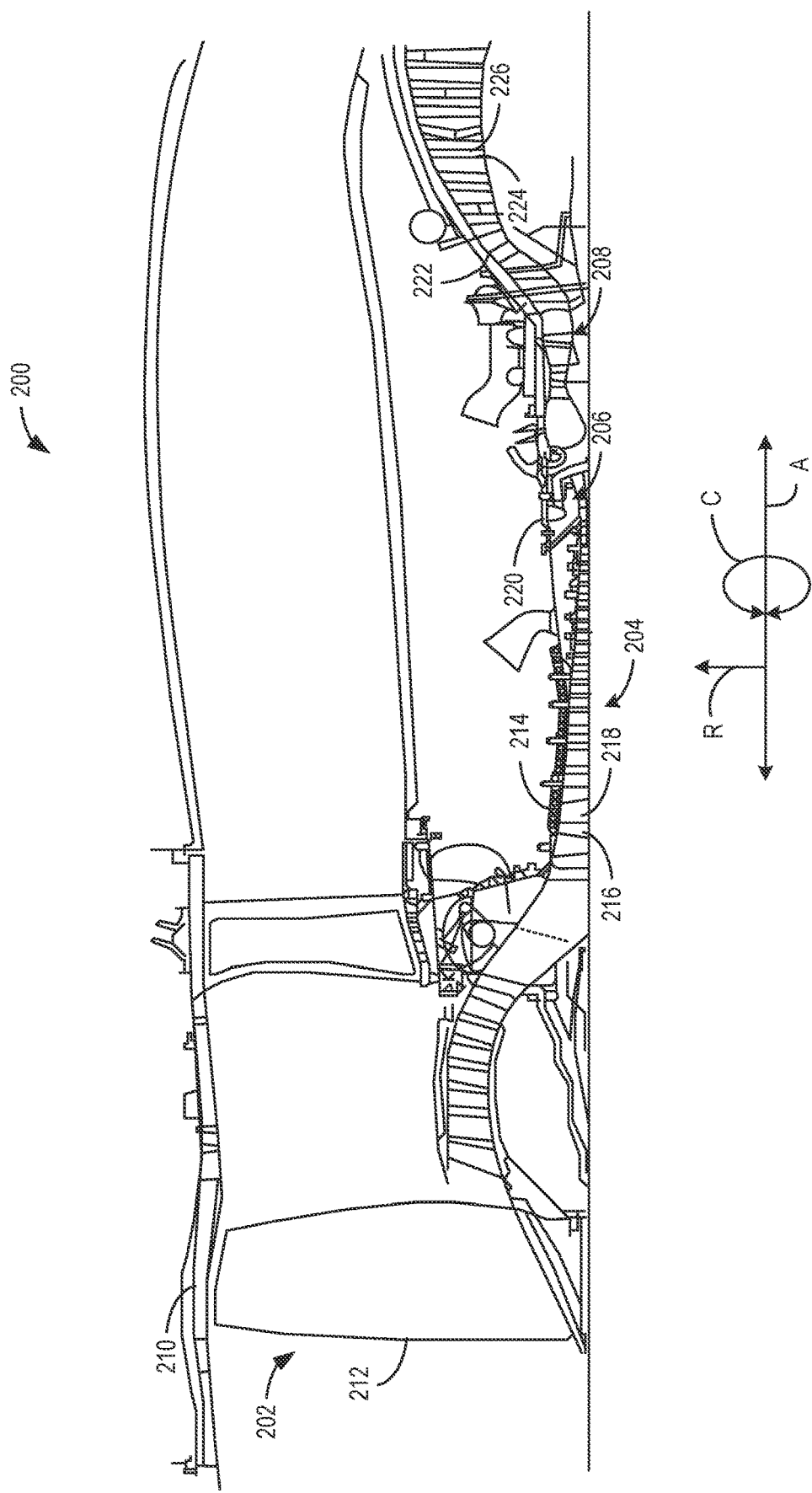
FIG. 2 illustrates an example turbofan engine having at least one fire retardant engine casing apparatus in accordance with the teachings disclosed herein.

FIG. 2 illustrates an example turbofan engine 200 in accordance with the teachings disclosed herein. In the illustrated example of FIG. 2, the turbofan engine 200 includes a fan section 202, a compressor section 204, a combustor section 206, and a turbine section 208. In FIG. 2, the fan section 202 includes a fan casing 210 and a fan 212. In FIG. 2, the compressor section 204 includes a compressor casing 214, first rotor blades 216, and first stator vanes 218. In FIG. 2, the combustor section 206 includes a combustor casing 220. In FIG. 2, the turbine section 208 includes a turbine casing 222, second stator vanes 224, and second rotor blades 226. In some examples, the fan 212, the first stator vanes 218, the first rotor blades 216, the second stator vanes 224, and/or the second rotor blades 226 include titanium. In FIG. 2, the fan casing 210, the compressor casing 214, the combustor casing 220, and/or the turbine casing 222 include a fire retardant engine casing apparatus further discussed in association with FIGS. 4, 5A, 5B, 5C, 6A, 6B, 6C, 7A, 7B, 7C, 8A, and 8B. As discussed in further detail herein, the fire retardant engine casing includes a cavity and a fire retardant material positioned in the cavity, which enables the fan casing 210, the compressor casing 214, the combustor casing 220, and/or the turbine casing 222 to prevent hazardous fires from occurring while having a reduced weight compared to the outer casing 108 of the prior art turbofan engine 100 of FIG. 1.

Figure 3:
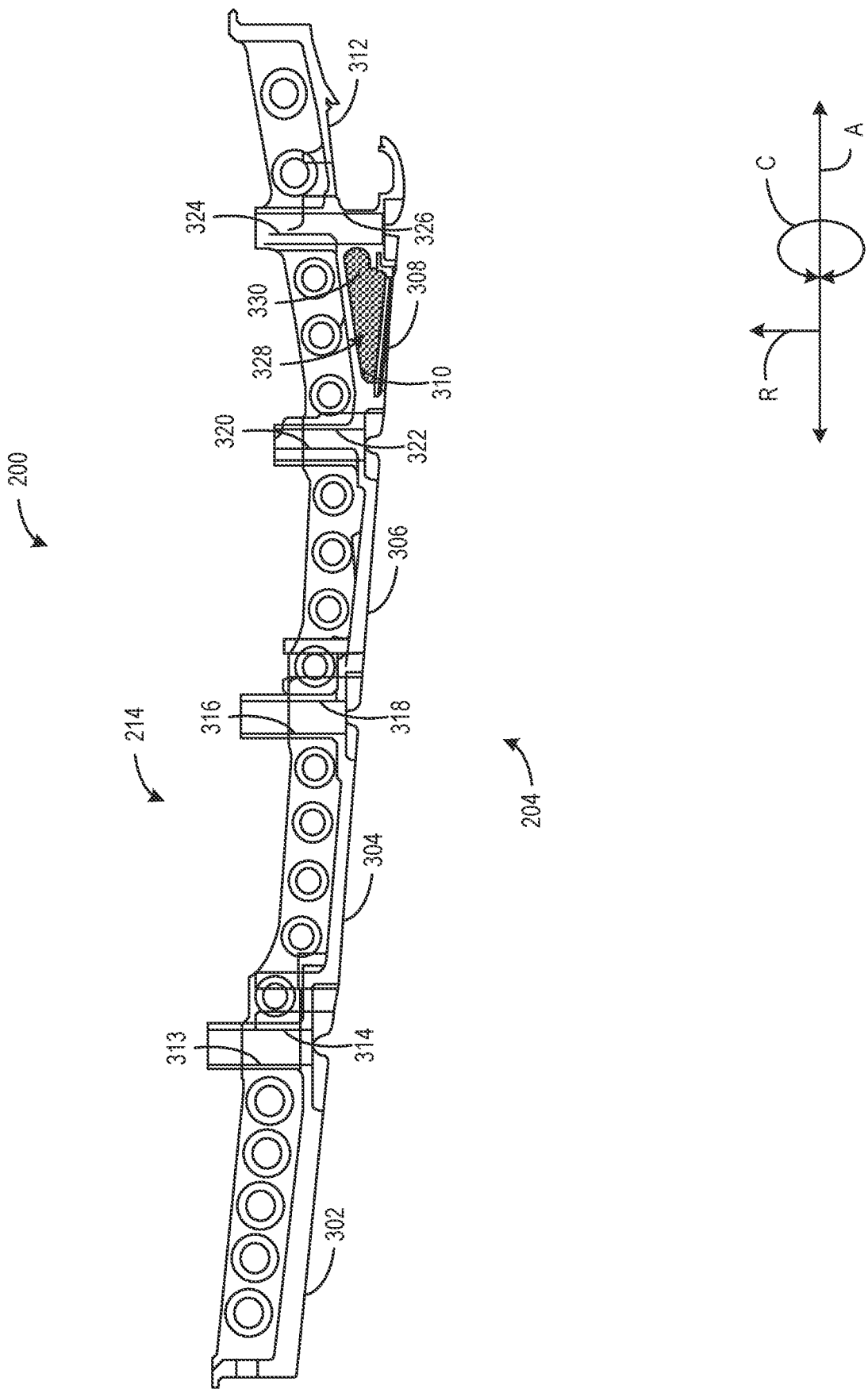
FIG. 3 illustrates a magnified view of a section of the turbofan engine of FIG. 2.

FIG. 3 illustrates a magnified view of the compressor casing 214 of FIG. 2 (e.g., the outer casing 108 of FIG. 1). In FIG. 3, the compressor casing 214 includes a first casing segment 302, a second casing segment 304, a third casing segment 306, a fourth casing segment 308, a fifth casing segment 310, and a sixth casing segment 312. In FIG. 3, an aft end 313 of the first casing segment 302 is coupled to a forward end 314 of the second casing segment 304. In FIG. 3, an aft end 316 of the second casing segment 304 is coupled to a forward end 318 of the third casing segment 306. In FIG. 3, an aft end 320 of the third casing segment 306 is coupled to a forward end 322 of the fourth casing segment 308 and the fifth casing segment 310. In FIG. 3, an aft end 324 of the fourth casing segment 308 and the fifth casing segment 310 is coupled to a forward end 326 of the sixth casing segment 312. In some examples, the casing segments 302, 304, 306, 308, 310, 312 are coupled via mechanical fasteners and/or welding.

In FIG. 3, the casing segments 302, 304, 306, 308, 310, 312 span in the axial direction A in the compressor section. Specifically, the casing segments 302, 304, 306, 308, 310, 312 are positioned at least partially around stages of the first rotor blades 216 and the first stator vanes 218 in the compressor section 204. The compressor casing 214 includes additional casing segments (not shown) similar to the first, second, third, fourth, fifth, and sixth casing segments 302, 304, 306, 308, 310, 312. The additional casing segments are coupled to circumferential ends of the first, second, third, fourth, fifth, and sixth casing segments 302, 304, 306, 308, 310, 312 such that the compressor casing 214 is positioned around the first rotor blades 216 and the first stator vanes 218 throughout the compressor section 204. In FIG. 3, the casing segments 302, 304, 306, 308, 310, 312 include fire retardant engine casing apparatus in accordance with the teachings disclosed herein.

In FIG. 3, the fifth casing segment 310 is positioned at least partially around the fourth casing segment 308. In FIG. 3, a cavity 328 at least partially separates the fourth casing segment 308 and the fifth casing segment 310. In FIG. 3, a fire retardant material 330 is positioned in the cavity 328. For example, the fire retardant material 330 can be a composite metal foam, a porous casting, a gel, a powder, and/or a coating on a surface of the fourth casing segment 308 and/or the fifth casing segment 310. In FIG. 3, the fire retardant material 330 includes an ultra-high temperature ceramic (e.g., zirconium carbide, zirconium boride, zirconium diboride, hafnium carbide, hafnium diboride, titanium carbide, silicon carbide, etc.), layered double hydroxide based nanocomposites, a graphene and layered double hydroxide hybrid nanocomposite, and/or ceramic nanostructures having graphene oxide layers. In FIG. 3, the fire retardant engine casing apparatus of the casing segments 302, 304, 306, 308, 310, 312 include the fire retardant material 330, as discussed in further detail below.

In FIG. 3, the fire retardant material 330 and the fire retardant apparatus associated with the fourth casing segment 308 and the fifth casing segment 310 improves fire retainment capabilities of a hot portion of the compressor section 204. Specifically, a temperature of air being compressed by the first rotor blades 216 and the first stator vanes 218 increases toward an aft end of the compressor section 204 and, thus, the fourth casing segment 308 can encounter high temperatures. Accordingly, the high temperatures may cause the fourth casing segment 308 to be susceptible to a fire that may result from friction between the first rotor blades 216 and the fourth casing segment 308. In FIG. 3, the fire retardant material 330 in the cavity 328 and/or the fifth casing segment 310 extinguishes, contains, or delays any fire that breaches the fourth casing segment 308 to minimize or otherwise reduce damage caused by the fire. As such, the fire containment capabilities of the fire retardant material 330 enables the fourth casing segment 308 to encounter more friction as a fire that may be caused by the friction is contained by the fire retardant material 330 in the cavity 328 and the fifth casing segment 310. In turn, tips of the first rotor blades 216 can be positioned closer to the fourth casing segment 308 to increase a compression efficiency obtained by the associated stages of the first rotor blades 216 and the first stator vanes 218. Specifically, less air is able to pass between the tips of the first rotor blades 216 and the fourth casing segment 308, which can improve thrust produced by the turbofan engine 200.

Figure 4:
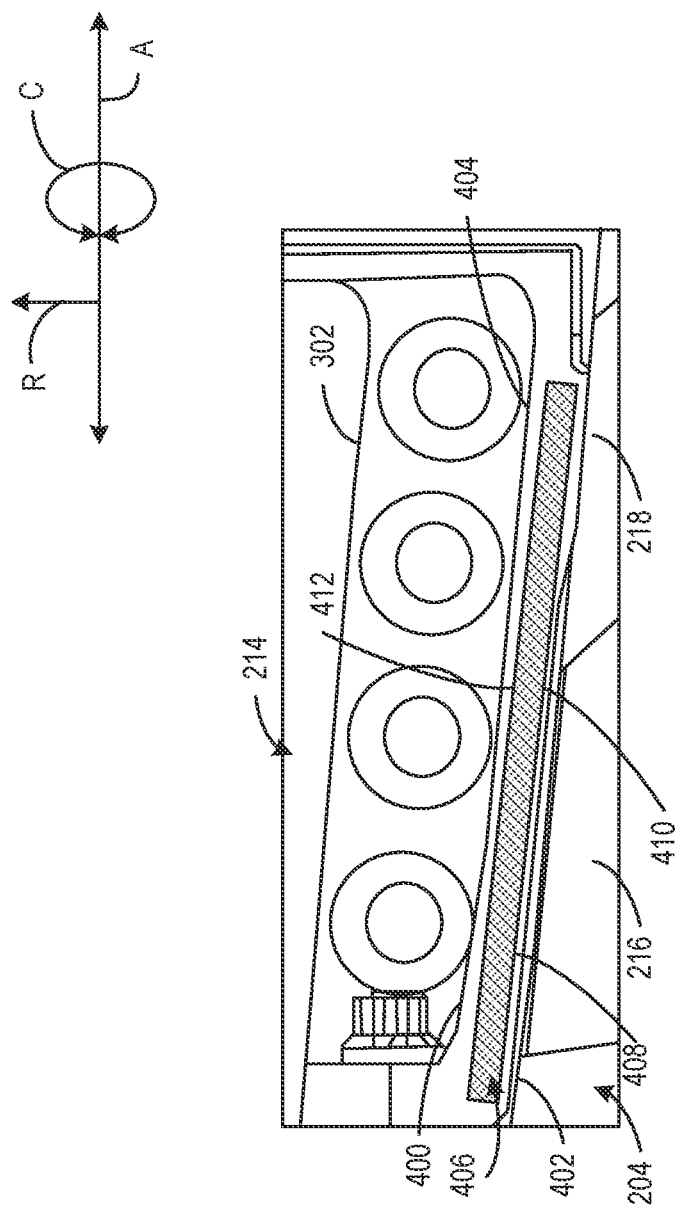
FIG. 4 illustrates a magnified view of the fire retardant engine casing apparatus of the turbofan engine of FIGS. 2 and 3.

FIG. 4 illustrates a magnified view of the first casing segment 302 of the compressor casing 214. In the illustrated example of FIG. 4, the first casing segment 302 includes a fire retardant casing apparatus 400. In FIG. 4, the fire retardant casing apparatus 400 includes an inner shell 402, an outer shell 404, and a chamber (e.g., a cavity, a slot, a space, etc.) 406 between the inner shell 402 and the outer shell 404.

In FIG. 4, the fire retardant casing apparatus 400 includes a fire retardant filler (e.g., the fire retardant material 330) 408 within the chamber 406. In some examples, the fire retardant casing apparatus 400 includes an internal structure (e.g., structural support) within the chamber 406. For example, the internal structure can be a honeycomb structure, a lattice structure, and/or a metal sponge. In some examples, the internal structure is coupled to an outer radial surface 410 of the inner shell 402 and an inner radial surface 412 of the outer shell 404. Additionally or alternatively, the fire retardant filler 408 can provide structural support between the inner shell 402 and the outer shell 404.

In FIG. 4, the fire retardant filler 408 can be a foam (e.g., a composite metal foam), a gel (e.g., a viscous gel), a porous casting, a powder, and/or a coating injected on a surface of the chamber 406 and/or on the internal structure within the chamber 406. In some examples, the fire retardant filler 408 is positioned in and/or enmeshes with the internal structure within the chamber 406. For example, the fire retardant filler 408 can be positioned within cells defined by the honeycomb structure, within pores defined by the metal foam, and/or within and around a framework of the lattice structure.

In FIG. 4, the fire retardant filler 408 is a layered double hydroxide based nanocomposite, a graphene and layered double hydroxide hybrid nanocomposite, ceramic nanostructures having graphene oxide layers, and/or an ultra-high-temperature ceramic. In some examples, the fire retardant filler 408 is formed via additive manufacturing, sintering, and/or casting.

In some examples, a volume of the chamber 406 and/or a volume of the fire retardant filler 408 within the chamber 406 is based on a size of the turbofan engine 200 (FIGS. 2 and 3) and/or an area of implementation of the fire retardant casing apparatus 400 within the turbofan engine 200. In some examples, the volume of the chamber 406 and/or the fire retardant filler 408 is larger in areas of the turbofan engine 200 more susceptible to fire. For example, the volume of the chamber 406 and/or the fire retardant filler 408 can be greater in areas of the compressor section 204 having a smaller clearance between the first rotor blades 216 and the compressor casing 214. In some examples, the volume of the chamber 406 and/or the fire retardant filler 408 is greater in areas having a smaller clearance between adjacent blades (e.g., between the first rotor blades 216 and the first stator vanes 218, between the second stator vanes 224 of FIG. 2 and the second rotor blades 226 of FIG. 2, etc.). In some examples, the volume of the chamber 406 and/or the fire retardant filler 408 is based on (e.g., directly related to) a cross-sectional area of a portion of an axial flow path aligned with the fire retardant casing apparatus 400 in the axial direction A. In some examples, the volume of the chamber 406 and/or the fire retardant filler 408 is based on temperatures typically encountered by the associated area of the turbofan engine 200. For example, the volume of the chamber 406 can be larger in areas of the turbofan engine 200 that encounter higher temperatures. As such, the chamber 406 and the fire retardant filler 408 can provide a larger buffer between the inner shell 402 and the outer shell 404 in such areas of the engine to prevent the outer shell 404 from being impacted by the higher temperatures. Accordingly, a structure of the outer shell 404 can be maintained in response to the inner shell 402 deforming from encountering a flame and, thus, the damage from the flame can be reduced.

In FIG. 4, in response to a fire within the compressor section 204 breaching the inner shell 402, the fire retardant filler 408 extinguishes or contains the fire and, thus, prevents the fire from breaching the outer shell 404 and causing further damage to the turbofan engine 200. For example, the fire retardant filler 408 can have a high temperature resistance to prevent the fire and/or heat from reaching the outer shell 404, which would otherwise cause the outer shell 404 to deteriorate and allow the fire to escape the compressor casing 214 causing further damage to the turbofan engine. Additionally or alternatively, the fire retardant filler 408 can dilute a concentration of oxygen nearby to extinguish the fire. As such, the first casing segment 302 can contain fires while having the chamber 406 between the inner shell 402 and the outer shell 404 to reduce a weight of the compressor casing 214 (e.g., compared to the outer casing of FIG. 1).

In some examples, the turbofan engine 200 continues to operate as the fire retardant filler 408 extinguishes the fire. In some examples, the fire retardant filler 408 delays the fire from spreading and breaching the outer shell 404 long enough to allow the turbofan engine 200 to be shut down mitigating any risk of further damage. As such, the fire retardant filler 408 minimizes or otherwise reduces damage encountered by the turbofan engine 200 in response to a fire. Accordingly, the fire retardant filler 408 enables the first casing segment 302 to be thinner (e.g., than the outer casing 108 of FIG. 1) and have a reduced weight. Moreover, fire containment capabilities associated with the fire retardant filler 408 enables the turbofan engine 200 to have a reduced clearance between a tip of the first rotor blades 216 and the compressor casing 214 as more friction can occur between the compressor casing 214 and the first rotor blades 216 without a hazardous fire breaching the outer shell 404. Likewise, the fire retardant filler 408 enables a clearance between the first rotor blades 216 and the first stator vanes to be reduced. In turn, the fire retardant filler 408 improves a specific fuel consumption and thrust capabilities of the turbofan engine 200 as a result of the reduced weight and/or the reduced clearance between the first rotor blades 216 and the compressor casing 214 and/or between the first rotor blades 216 and the first stator vanes 218.

Although the illustrated example of FIG. 4 only shows the first casing segment 302 of FIG. 3, the second casing segment 304, the third casing segment 306, the fourth casing segment 308, and the fifth casing segment 310 of FIG. 3 also include the fire retardant casing apparatus 400. Additionally or alternatively, although the illustrated example of FIGS. 3 and 4 are associated with the compressor casing 214 of the turbofan engine 200 of FIGS. 2 and 3, the fan casing 210 (FIG. 2), the combustor casing 220 (FIG. 2), and/or the turbine casing 222 (FIG. 2) can include the fire retardant casing apparatus 400.

FIG. 5A illustrates a first example casing apparatus 502 (e.g., a first example implementation or structure of the fire retardant casing apparatus 400 of FIG. 4). In FIG. 5A, the first casing apparatus 502 includes a first inner shell 504, sidewalls 506, and a pocket 508 defined by the first inner shell 504 and the sidewalls 506. In FIG. 5A, the first inner shell 504 and the sidewalls 506 are integrally formed via metalworking. For example, the first inner shell 504, the sidewalls 506, and, in turn, the pocket 508 can be formed via machined forgings. In some examples, the first inner shell 504 and the sidewalls 506 are centrifugally casted and machined to form the pocket 508. In some examples, the first inner shell 504 and the sidewalls 506 are formed separately and subsequently coupled. In some examples, the first inner shell 504 is formed via rolling and, in turn, the sidewalls 506 are welded to ends of the first inner shell 504. In some examples, the first inner shell 504, the sidewalls 506, and, in turn, the pocket 508 are formed via additive manufacturing. The sidewalls 506 can be coupled to other ones of the first casing apparatus 502 that span along the circumferential direction C of the turbofan engine 200 (FIGS. 2 and 3).

In FIG. 5A, the first casing apparatus 502 includes a fire retardant filler 510 in the pocket 508. In FIG. 5A, the fire retardant filler 510 can include layered double hydroxide based nanocomposites, a graphene and layered double hydroxide hybrid nanocomposite, ceramic nanostructures having graphene oxide layers, and/or ultra-high-temperature ceramics. In some examples, the fire retardant filler 510 is a composite metal foam, a powder, a porous casting, and/or a gel that at least partially fills the pocket 508. That is, the composite metal foam and/or the gel includes the layered double hydroxide based nanocomposites, the graphene and layered double hydroxide hybrid nanocomposite, the ceramic nanostructures having graphene oxide layers, and/or the ultra-high-temperature ceramics. Specifically, the fire retardant filler 510 has a high temperature resistance capability to contain a flame that breaches the first inner shell 504. In FIG. 5A, the composite metal foam, the powder, the porous casting, and/or the gel have a high surface area and low weight. In some examples, a mechanical strength of the fire retardant filler 510 is substantially maintained at temperatures greater than 1100° C. (e.g., within 50% of a maximum mechanical strength). In some examples, when the fire retardant filler 510 is the composite metal foam, the fire retardant filler 510 is coupled to the first inner shell 504 and/or the sidewalls 506.

In some examples, the fire retardant filler 510 is formed in the pocket 508 via additive manufacturing. For example, the fire retardant filler 510 can include the layered double hydroxide based nanocomposites, the graphene and layered double hydroxide hybrid nanocomposite, the ceramic nanostructures having graphene oxide layers, and/or the ultra-high-temperature ceramics formed into the composite metal foam structure via additive manufacturing. Additionally or alternatively, the fire retardant filler 510 can include particles of the layered double hydroxide based nanocomposites, the graphene and layered double hydroxide hybrid nanocomposite, the ceramic nanostructures having graphene oxide layers, and/or the ultra-high-temperature ceramics formed in a gel via additive manufacturing.

In some examples, the fire retardant filler 510 is formed via sintering (e.g., electric current assisted sintering, pressureless sintering, spark plasma sintering, etc.). For example, particles of the layered double hydroxide based nanocomposites, the graphene and layered double hydroxide hybrid nanocomposite, the ceramic nanostructures having graphene oxide layers, and/or the ultra-high-temperature ceramics can be bonded via sintering to form the composite metal foam fire retardant filler 510. Accordingly, sintering the particles can increase a density and, thus, a mechanical strength of the composite metal foam. Additionally or alternatively, sintering the particles can uniformly control a porosity of the composite metal foam. In some examples, the fire retardant filler 510 is formed via centrifugal casting. In some examples, the fire retardant filler 510 is injected onto a surface of the first inner shell 504 and the sidewalls 506 and coats the pocket 508.

In some examples, when the fire retardant filler 510 includes the composite metal foam, the composite metal foam can have an open-cell structure or a closed-cell structure. In some examples, a first portion of the fire retardant filler 510 is the composite metal foam and a second portion of the fire retardant filler 510 is the gel. In some examples, when the fire retardant filler 510 includes the open-cell composite metal foam, the gel can intertwine with the composite metal foam. In some examples, when the fire retardant filler 510 includes the closed-cell composite metal foam, the gel or powder can fill the cells defined by the composite metal foam.

In FIG. 5A, the fire retardant filler 510 contains, delays, and/or extinguishes a fire that breaches the first inner shell 504. In addition to having a reduced weight as a result of not being a solid casing (e.g., the outer casing 108 of the prior art turbofan engine 100 of FIG. 1), the improved fire containment capabilities of the first casing apparatus 502 provided by the fire retardant filler 510 enables the first inner shell 504 to encounter more rub from the first rotor blades 216 (FIGS. 2 and 4) because the first rotor blades 216 (FIGS. 2 and 4) and/or the first inner shell 504 can encounter more friction without increasing a likelihood of a fire breaching the first casing apparatus 502. Thus, the reduced gap between the tips of the first rotor blades 216 and the first inner shell 504 causes the turbofan engine 200 to produce more thrust, which, in addition to the reduced weight of the turbofan engine 200, improves a thrust-specific fuel consumption of the turbofan engine 200.

Additionally or alternatively, the fire retardant filler 510 can receive and contain fragments of fan blades (e.g., from the fan 212 of FIG. 2) and/or absorb an impact of the fan blades in response to a fan blade or fragments thereof piercing the first inner shell 504. Accordingly, the fire retardant filler 510 can minimize or otherwise reduce damage that results from the fan blade out event.

In FIG. 5A, the first casing apparatus 502 includes a first outer shell 512. In FIG. 5A, the first outer shell 512 is coupled to ends of the sidewalls 506 opposite the first inner shell 504 to cover the pocket 508. In some examples, the first outer shell 512 is coupled to the sidewalls 506 to enclose the pocket 508 and, thus, the fire retardant filler 510. For example, the first outer shell 512 can be coupled to the sidewalls 506 via welding. In FIG. 5A, the first inner shell 504, the sidewalls 506, and the first outer shell 512 are metal. For example, the first inner shell 504, the sidewalls 506, and the first outer shell 512 can include stainless steel, aluminum, nickel, titanium, cobalt, and/or any other metals.

In some examples, despite the high temperature resistance capability of the fire retardant filler 510, the fire retardant filler 510 may have a relatively low oxidation resistance. For example, hafnium carbide has a melting point of about 3,900° C. but can encounter oxidation at temperatures as low as 430° C. In FIG. 5A, the fire retardant filler 510 is positioned within the pocket 508 and enclosed by the first inner shell 504, the sidewalls 506, and the first outer shell 512 to conceal the fire retardant filler 510 from air passing through the turbofan engine 200 and, thus, prevent the fire retardant filler 510 from oxidizing in hotter areas of the turbofan engine 200. In some examples, in response to a fire breaching the first inner shell 504, the fire retardant filler 510 oxidizes and absorbs oxygen that moves into the pocket 508 to extinguish the fire. Moreover, the fire retardant filler 510 maintains a high resistance to temperature change, which enables the fire retardant filler 510 to provide a barrier between the flow path in the compressor section 204 (FIGS.

2, 3, and 4) and the first outer shell 512 and, thus, prevent the first outer shell 512 from encountering increased temperatures.

In some examples, when the fire retardant filler 510 includes layered double hydroxide based nanocomposites, the fire retardant filler 510 releases an inert gas in response to encountering a flame. In turn, the inert gas can dilute an oxygen concentration in air at least partially contained by the first outer shell 512 to make the air less susceptible to ignition, which extinguishes the flame or at least prevents or delays a spread of the flame. Additionally, to prevent the flame from spreading across the fire retardant filler 510, a surface of the fire retardant filler 510 can char in response to encountering the fire, which prevents components of combustion from interacting with an unburnt portion of the fire retardant filler 510.

In FIG. 5A, the first casing apparatus 502 includes an abradable layer 514 fixed to a surface of the first inner shell 504 opposite the pocket 508 (e.g., an inner radial surface of the first inner shell 504). In FIG. 5A, the abradable layer 514 protects the first inner shell 504 and/or fan blades at least partially surrounded by the first casing apparatus 502 (e.g., the fan 212, the first rotor blades 216, the second rotor blades 226 of FIG. 2) from friction and associated wear as a result of a rotation of the fan blades. In some examples, the first casing apparatus 502 does not include the abradable layer 514. Specifically, the fire retardant filler 510 enables the first inner shell 504 to encounter more friction without causing a hazardous fire.

FIG. 5B illustrates a second example casing apparatus (e.g., a second example structure or implementation of the fire retardant casing apparatus 400 of FIG. 4) 520. In FIG. 5B, the second casing apparatus 520 includes the first inner shell 504, the sidewalls 506, the pocket 508, the fire retardant filler 510, and the abradable layer 514 of FIG. 5A. In FIG. 5B, the second casing apparatus 520 includes a second example outer shell 522. In FIG. 5B, the second outer shell 522 includes a coating to block, resist, and/or delay a spread of fires. In some examples, the second outer shell 522 is coated via a thermal spraying. In some examples, the second outer shell 522 is coated via cold spraying. In some examples, the second outer shell 522 is coated via electrochemical deposition. For example, the coating of the second outer shell 522 can include layered double hydroxide based nanocomposites, graphene and layered double hydroxide hybrid nanocomposite, ceramic nanostructures having graphene oxide layers, and/or ultra-high-temperature ceramics. Accordingly, the second outer shell 522 can extinguish, contain, or delay any flames that pass through the pocket 508.

FIG. 5C illustrates a third example casing apparatus (e.g., a third example structure or implementation of the fire retardant casing apparatus 400 of FIG. 4) 530. In FIG. 5C, the third example casing apparatus 530 includes the fire retardant filler 510, the first outer shell 512, a second inner shell 532, and a screen 534. In some examples, the third casing apparatus 530 includes the second outer shell 522 (FIG. 5B) instead of the first outer shell 512.

In FIG. 5C, a first circumferential end 536 of the second inner shell 532 and a first circumferential end 538 of the first outer shell 512 are coupled to a first adjacent casing segment (e.g., a casing segment similar to the third casing apparatus 530). In FIG. 5C, a second circumferential end 540 of the second inner shell 532 and a second circumferential end 542 of the first outer shell 512 are coupled to a second adjacent casing segment opposite the first adjacent casing segment (e.g., a casing segment similar to the third casing apparatus 530). Accordingly, the compressor casing 214 (FIGS. 2, 3, and 4) includes a plurality of the third casing apparatus 530 coupled to one another at respective circumferential ends thereof to surround the compressor section 204 (FIGS. 2, 3, and 4) of the turbofan engine 200 (FIGS. 2 and 3).

In FIG. 5C, the second inner shell 532 includes perforations (e.g., holes, slots, openings, etc.) 544 to receive acoustic waves. For example, an inner radial surface 546 of the second inner shell 532 can encounter acoustic waves produced within and/or passing through the compressor section 204 (FIGS. 2, 3, and 4). In FIG. 5C, the fire retardant filler 510 includes the graphene oxide and layered double hydroxide hybrid nanocomposite and/or ceramic nanostructures having graphene oxide layers to attenuate the acoustic waves that pass through the perforations 544. In FIG. 5C, the perforations 544 are irregularly (e.g., non-uniformly, randomly, etc.) spaced apart. In some other examples, the perforations 544 are uniformly spaced apart.

In FIG. 5C, the screen 534 is coupled to an outer radial surface 548 of the second inner shell 532 to separate the perforations 544 in the second inner shell 532 from the fire retardant filler 510. In some examples, the screen 534 is a sheet of nickel alloy, ceramic, or another high temperature capability alloy to enable the screen 534 to withstand high temperatures. In some examples, the screen 534 is a same material as the second inner shell 532. In some examples, the screen 534 is integrally formed with the second inner shell 532 via additive manufacturing. In some examples, the screen 534 is coupled to the second inner shell 532 via brazing. Accordingly, the screen 534 can prevent portions of the fire retardant filler 510 from escaping through the perforations 544, such as when the fire retardant filler 510 includes the gel. Additionally, the screen 534 can separate the fire retardant filler 510 from air moving through the turbofan engine 200 to prevent the fire retardant filler 510 from oxidizing. As such, the screen 534 preserves the fire retardant filler 510 while the perforations 544 in the second inner shell 532 enable the fire retardant filler 510 to provide acoustic attenuation. In some examples, the fire retardant filler 510 is coupled to the first outer shell 512 and the screen 534. In some examples, the fire retardant filler 510 is coupled to the first outer shell 512 and to a solid (e.g., unperforated) portion of the second inner shell 532. For example, the screen 534 can cover the perforations 544 and the fire retardant filler 510 can be coupled to the outer radial surface 548 of the second inner shell 532 around a perimeter of the screen 534. In some examples, the fire retardant filler 510 coats the second inner shell 532, the screen 534, and/or the first outer shell 512.

FIG. 6A illustrates a fourth example casing apparatus (e.g., a fourth example structure or implementation of the fire retardant casing apparatus 400 of FIG. 4) 602. In FIG. 6A, the fourth casing apparatus 602 includes the first inner shell 504, the sidewalls 506, the pocket 508, the fire retardant filler 510, the first outer shell 512, and the abradable layer 514.

In FIG. 6A, the fourth casing apparatus 602 includes a honeycomb structure 604 in the pocket 508 with the fire retardant filler 510. In FIG. 6A, the honeycomb structure 604 is coupled to the first inner shell 504 and the first outer shell 512. In some examples, the honeycomb structure 604 is integrally formed with the first inner shell 504. For example, the honeycomb structure 604 and the first inner shell 504 can be formed via additive manufacturing. In some examples, the honeycomb structure 604 is coupled to the first inner shell 504 and/or the first outer shell 512 via welding. Accordingly, the honeycomb structure 604 provides the fourth casing apparatus 602 with increased structural support. As such, the honeycomb structure 604 can provide the fourth casing apparatus 602 with increased impact absorption in response to a fan blade out event occurring.

In FIG. 6A, the fire retardant filler 510 is positioned within compartments 606 defined by the honeycomb structure 604. In some examples, the fire retardant filler 510 is coupled to the honeycomb structure 604, the first inner shell 504, and/or the first outer shell 512. For example, the fire retardant filler 510 can be a composite metal foam that is coupled to the honeycomb structure 604, the first inner shell 504, and/or the first outer shell 512. In some examples, the fire retardant filler 510 is a coating on the honeycomb structure 604, the first inner shell 504, and/or the first outer shell 512. For example, the fire retardant filler 510 can be injected onto surfaces of the honeycomb structure 604 that define the compartments 606.

In FIG. 6A, the honeycomb structure 604 defines between 20% and 40% of a volume of the pocket 508. In FIG. 6A, the fire retardant filler 510 defines between 60% and 80% of the volume of the pocket 508. In some examples, the honeycomb structure 604 and the fire retardant filler 510 respectively define between 10% and 90% of the volume of the pocket 508.

In some examples, the honeycomb structure 604 can cause a flame to enter the respective compartments 606 that include the fire retardant filler 510. Accordingly, portions of the fire retardant filler 510 encounter respective portions of the flame and, in turn, extinguish or contain the respective portions of the flame locally. In some examples, the fire retardant filler 510 releases inert gas within the respective compartments 606 of the honeycomb structure 604 to extinguish the flame or prevent or delay a spread of the flame. In some examples, the high temperature resistance of the fire retardant filler 510 prevents the flame from passing through the compartments 606 of the honeycomb structure 604 and, thus, prevents the fire from breaching the first outer shell 512.

FIG. 6B illustrates a fifth example casing apparatus (e.g., a fifth example structure or implementation of the fire retardant casing apparatus 400 of FIG. 4) 610. In FIG. 6B, the fifth casing apparatus 610 includes the first inner shell 504, the sidewalls 506, the pocket 508, the fire retardant filler 510, the abradable layer 514, the second outer shell 522, and the honeycomb structure 604. In FIG. 6B, the honeycomb structure 604 is coupled to the first inner shell 504 and the second outer shell 522. In FIG. 6B, the fire retardant filler 510 is positioned within the cells defined by the honeycomb structure 604, similar to the fourth example casing apparatus 602 of FIG. 6A. In FIG. 6B, the second outer shell 522 and the fire retardant filler 510 extinguish, contain, or delay flames that breach the first inner shell 504.

FIG. 6C illustrates a sixth example casing apparatus (e.g., a sixth example structure of the fire retardant casing apparatus 400 of FIG. 4) 620. In FIG. 6C, the sixth casing apparatus 620 includes the fire retardant filler 510, the first outer shell 512, the second inner shell 532, the screen 534, and the honeycomb structure 604. In some examples, the third casing apparatus 530 includes the second outer shell 522 instead of the first outer shell 512. In FIG. 6C, the perforations 544 in the second inner shell 532 align with the compartments 606 defined by the honeycomb structure 604 in the radial direction R. For example, one of the perforations 544 can align with one of the compartments 606. Additionally or alternatively, two of the perforations 544 can align with one of the compartments 606.

FIG. 7A illustrates a seventh example casing apparatus (e.g., a seventh example structure of the fire retardant casing apparatus 400 of FIG. 4) 702. In FIG. 7A, the seventh casing apparatus 702 includes the first inner shell 504, the sidewalls 506, the pocket 508, the fire retardant filler 510, the first outer shell 512, the abradable layer 514, and a lattice structure 704 positioned in the pocket 508 with the fire retardant filler 510. In FIG. 7A, the lattice structure 704 is coupled to the first inner shell 504 and the first outer shell 512. Accordingly, the lattice structure 704 provides the compressor casing 214 (FIGS. 2, 3, and 4) with an increased stiffness in areas where more structural support is needed while still having a reduced weight compared to the outer casing 108 of FIG. 1.

In FIG. 7A, the fire retardant filler 510 defines a first portion of a volume of the pocket 508 and the lattice structure 704 defines a second portion of the volume of the pocket 508. In some examples, the first portion of the volume of the pocket 508 is less than the second portion of the volume of the pocket 508. For example, the fire retardant filler 510 can define between 20-60% of the volume of the pocket 508 and the lattice structure 704 can define between 40-80% of the volume of the pocket 508.

In FIG. 7A, the fire retardant filler 510 enmeshes with and/or coats the lattice structure 704. For example, the fire retardant filler 510 can entangle with the lattice structure 704 and be positioned in spaces within the pocket 508 unoccupied by the lattice structure 704. In some examples, the fire retardant filler 510 is injected onto a surface of the lattice structure. In FIG. 7A, the lattice structure 704 provides an additional barrier that protects the first outer shell 512 from any flames breached by the first inner shell 504. As such, a temperature resistance of the fire retardant filler 510 and the lattice structure 704, and/or a decreased concentration of oxygen in the pocket 508 caused by the fire retardant filler 510 in response to a flame breaching the first inner shell 504, can extinguish, contain, or delay the flame that breaches the first inner shell 504 and, thus, minimize or otherwise reduce damage encountered by the turbofan engine 200 (FIGS. 2 and 3).

FIG. 7B illustrates an eighth example casing apparatus (e.g., a seventh example structure of the fire retardant casing apparatus 400) 706. In FIG. 7B, the eighth casing apparatus 706 includes the first inner shell 504, the sidewalls 506, the pocket 508, the fire retardant filler 510, the abradable layer 514, the second outer shell 522, and the lattice structure 704. In FIG. 7B, the lattice structure 704 is coupled to the first inner shell 504 and the second outer shell 522.

FIG. 8A illustrates a ninth example casing apparatus (e.g., a tenth example structure of the fire retardant casing apparatus 400) 802. In FIG. 8A, the ninth example casing apparatus 802 includes the first inner shell 504, the sidewalls 506, the pocket 508, the fire retardant filler 510, the first outer shell 512, the abradable layer 514, and a metal sponge 804 positioned in the pocket 508 with the fire retardant filler 510. In FIG. 8A, the metal sponge 804 is coupled to the first inner shell 504 and the first outer shell 512.

In FIG. 8A, the fire retardant filler 510 defines a first portion of a volume of the pocket 508 and the metal sponge 804 defines a second portion of the volume of the pocket 508. For example, the fire retardant filler 510 can define between 10-50% of the volume of the pocket 508 and the metal sponge 804 can define between 40-90% of the volume of the pocket 508.

In FIG. 8A, the fire retardant filler 510 coats the metal sponge 804 and/or is positioned within pores of the metal sponge 804. For example, the fire retardant filler 510 can be injected on a surface of the metal sponge 804 and/or positioned in pores of the metal sponge 804. In FIG. 8A, the metal sponge 804 provides an additional barrier that protects the first outer shell 512 from encountering high temperatures. Accordingly, the temperature resistance of the metal sponge 804 and the fire retardant filler 510 can preserve a structural integrity of the first outer shell 512.

FIG. 8B illustrates a tenth example casing apparatus (e.g., a seventh example structure of the fire retardant casing apparatus 400) 806. In FIG. 8A, the ninth example casing apparatus 802 includes the first inner shell 504, the sidewalls 506, the pocket 508, the fire retardant filler 510, the abradable layer 514, the second outer shell 522, and the metal sponge 804. In FIG. 8B, the metal sponge 804 is coupled to the first inner shell 504 and the second outer shell 522.

The foregoing examples of the fire retardant casing apparatus can be used in turbofan engines. Although each example fire retardant casing apparatus disclosed above has certain features, it should be understood that it is not necessary for a particular feature of one example fire retardant casing apparatus to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

In some examples, the apparatus includes means for producing aerodynamic forces. For example, the means for producing aerodynamic forces may be implemented by the fan 212, the first rotor blades 216, the first stator vanes 218, the second stator vanes 224, and/or the second rotor blades 226.

In some examples, the apparatus includes means for retarding fire. For example, the means for retarding fire may be implemented by the fire retardant filler 510. In some examples, the means for retarding fire may be implemented by the composite metal foam fire retardant filler 510, the gel fire retardant filler 510, and/or the porous casting fire retardant filler 510. In some examples, the foam fire retardant filler 510 is implemented by the coating fire retardant filler 510 on the first inner shell 504, the sidewalls 506, the first outer shell 512, the second outer shell 522, the second inner shell 532, the screen 534, the honeycomb structure 604, the lattice structure 704, and/or the metal sponge 804. In some examples, the means for retarding fire is implemented by zirconium carbide, zirconium boride, zirconium diboride, hafnium carbide, hafnium diboride, titanium carbide, silicon carbide, layered double hydroxide based nanocomposites, a graphene and layered double hydroxide hybrid nanocomposite, and/or ceramic nanostructures having graphene oxide layers.

In some examples, the apparatus includes means for providing structural support. For example, the means for providing structural support may be implemented by the honeycomb structure 604, the lattice structure 704, and/or the metal sponge 804.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

From the foregoing, it will be appreciated that example casing apparatus have been disclosed that extinguish, contain, or delay fires, such as titanium fires, that occur within a turbofan engine while having a reduced weight. Moreover, the example casing apparatus enables more friction to occur within the turbofan engine without presenting a hazardous fire risk. As such, tips of fan blades can be positioned closer to the casing and/or adjacent vanes to enable more thrust to be produced. Accordingly, the fan blades can be manufactured with a reduced tolerance, which reduces a cost of manufacturing the turbofan engine.

Example fire retardant engine casing apparatus are disclosed herein. Further examples and combinations thereof include the following:

An engine casing comprising an inner shell circumferentially surrounding blades of a fan, a compressor, or a turbine, an outer shell positioned around the inner shell, and a fire retardant material between the inner shell and the outer shell.

The engine casing of any preceding clause, further including a honeycomb structure fixed to the inner shell and the outer shell, the fire retardant material within cells defined by the honeycomb structure.

The engine casing of any preceding clause, further including a lattice structure or a metal sponge fixed to the inner shell and the outer shell, the fire retardant material to enmesh with the lattice structure or the metal sponge.

The engine casing of any preceding clause, wherein the blades include titanium.

The engine of any preceding clause, wherein the inner shell or the outer shell includes titanium.

The engine casing of any preceding clause, wherein the fire retardant material is a composite metal foam.

The engine casing of any preceding clause, wherein the fire retardant material is a gel.

The engine casing of any preceding clause, wherein the fire retardant material is a powder.

The engine casing of any preceding clause, wherein the fire retardant material is a coating on at least one of an outer radial surface of the inner shell, an inner radial surface of the outer shell, or an internal structure fixed to the inner shell and the outer shell.

The engine casing of any preceding clause, wherein the fire retardant material includes at least one of layered double hydroxide based nanocomposites or ultra-high-temperature ceramics.

The engine casing of any preceding clause, wherein the outer shell is coated via cold spraying, thermal spraying, or electrochemical deposition.

An axial flow engine comprising a casing including a chamber between an inner radial surface and an outer radial surface, and a fire retardant filler within the chamber, the fire retardant filler formed via at least one of sintering, additive manufacturing, or casting.

The axial flow engine of any preceding clause, further including an internal structure coupled to the inner radial surface and the outer radial surface.

The axial flow engine of any preceding clause, wherein a volumetric ratio of the internal structure and the fire retardant filler within the chamber is based on at least one of an area of the axial flow engine or a size of the axial flow engine.

The axial flow engine of any preceding clause, wherein the casing circumferentially surrounds at least a portion of a fan.

The axial flow engine of any preceding clause, wherein the casing is a first casing segment of a plurality of casing segments, an aft end of the first casing segment coupled to a forward end of a second casing segment of the plurality of casing segments, a first circumferential end of the first casing segment coupled to a second circumferential end of a third casing segment of the plurality of casing segments.

The axial flow engine of any preceding clause, wherein the casing circumferentially surrounds at least a portion of a combustor of the axial flow engine.

The axial flow engine of any preceding clause, wherein the casing circumferentially surrounds at least a portion of a turbine section of the axial flow engine.

The axial flow engine of any preceding clause, wherein the casing circumferentially surrounds at least a portion of a compressor section of the axial flow engine.

The axial flow engine of any preceding clause, wherein the fire retardant filler includes an epoxy resin or a ceramic nanostructure.

An apparatus comprising means for producing aerodynamic forces, a casing positioned around the means for producing aerodynamic forces, the casing including a cavity between an inner radial surface of the casing and an outer radial surface of the casing, and means for retarding fire inside the cavity.

The apparatus of any preceding clause, further including means for providing structural support inside the cavity.

The apparatus of any preceding clause, wherein the means for retarding fire fills a first volumetric portion of the cavity and the means for providing structural support fills a second volumetric portion of the cavity separate from the first volumetric portion.

The apparatus of any preceding clause, wherein the means for retarding fire is disposed around the means for providing structural support.

The apparatus of any preceding clause, wherein the means for providing structural support at least partially surrounds the means for retarding fire within the cavity.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An engine casing comprising:
   an inner shell circumferentially surrounding blades of a fan, a compressor, or a turbine;
   an outer shell positioned around the inner shell;
   a fire retardant material between the inner shell and the outer shell; and
   an internal structure coupled to the inner shell and the outer shell, wherein a volumetric ratio of the internal structure and the fire retardant material between the inner shell and the outer shell is based on at least one of an area of implementation within an axial flow engine or a size of the axial flow engine.

2. The engine casing of claim 1, further including a honeycomb structure fixed to the inner shell and the outer shell, the fire retardant material within cells defined by the honeycomb structure.

3. The engine casing of claim 1, wherein at least one of the blades, the inner shell, or the outer shell include titanium.

4. The engine casing of claim 1, wherein the fire retardant material is a coating on at least one of an outer radial surface of the inner shell, an inner radial surface of the outer shell, or the internal structure coupled to the inner shell and the outer shell.

5. The engine casing of claim 1, wherein the fire retardant material includes at least one of a composite metal foam, a porous casting, a gel, a powder, an epoxy resin, a ceramic nanostructure, layered double hydroxide based nanocomposites, or ultra-high-temperature ceramics.

6. The engine casing of claim 1, wherein the outer shell is coated via cold spraying, thermal spraying, or electrochemical deposition.

7. The engine casing of claim 1, wherein the fire retardant material is formed via at least one of sintering, additive manufacturing, or casting.

8. The engine casing of claim 1, wherein the inner shell circumferentially surrounds at least a portion of a combustor of the axial flow engine.

9. The axial flow engine of claim 7, wherein the fire retardant filler material includes an epoxy resin or a ceramic nanostructure.

10. An apparatus comprising:
    means for producing aerodynamic forces;
    a casing positioned around the means for producing aerodynamic forces, the casing including a cavity between an inner radial surface of the casing and an outer radial surface of the casing;
    means for retarding fire inside the cavity; and
    means for providing structural support coupled to the inner radial surface and the outer radial surface, wherein a volumetric ratio of the means for providing structural support and the means for retarding fire within the cavity is based on at least one of an area of implementation of the casing in an axial flow engine or a size of the axial flow engine.

11. The apparatus of claim 10, wherein the means for providing structural support at least partially surrounds the means for retarding fire within the cavity.

12. The engine casing of claim 1, wherein the internal structure is at least one of a lattice structure or a metal sponge, and wherein the fire retardant material enmeshes with at least one of the lattice structure or the metal sponge.

13. The axial flow engine of claim 1, wherein the inner shell includes perforations, further including a screen between the inner shell and the fire retardant material.

14. The engine casing of claim 1, wherein the volumetric ratio of the internal structure and the fire retardant material is defined by each of the internal structure and the fire retardant material occupying between 10% and 90% of a volume between the inner shell and the outer shell.

15. The engine casing of claim 1, wherein the volumetric ratio includes the internal structure occupying between 60% and 80% of a volume between the inner shell the outer shell, and wherein the volumetric ratio includes the fire retardant material occupying between 20% and 40% of the volume between the inner shell and the outer shell.

16. The engine casing of claim 1, wherein the volumetric ratio includes a first volume percentage of the fire retardant material when the blades are of the fan or the compressor, and wherein the volumetric ratio includes a second volume percentage of the fire retardant material when the blades are of the turbine, and wherein the second volume percentage is greater than the first volume percentage.

17. An engine casing comprising:
    an inner shell circumferentially surrounding blades of a fan, a compressor, or a turbine;
    an outer shell positioned around the inner shell;
    a fire retardant material between the inner shell and the outer shell, wherein the fire retardant material defines between 20-50% of a volume between the inner shell and the outer shell; and
    at least one of a lattice structure or a metal sponge coupled to an inner radial surface of the outer shell and an outer radial surface of the inner shell, the fire retardant material to entangle with at least one of the lattice structure or the metal sponge, wherein the at least one of the lattice structure or the metal sponge defines between 40-80% of the volume between the inner shell and the outer shell.

18. The engine casing of claim 17, wherein the inner shell and the outer shell are in contact with a first sidewall and a second sidewall, wherein a cross-sectional area is defined between the inner shell and the outer shell extending from the first sidewall to the second sidewall, and wherein the fire retardant material entangled with at least one of the lattice structure or the metal sponge includes at least a portion of the fire retardant material and at least a portion of the at least one of the lattice structure or the metal sponge occupying a same portion of the cross-sectional area.

19. The engine casing of claim 17, wherein the inner shell includes a first surface and a second surface opposite the first surface, wherein the fire retardant material is in contact with the first surface, further including an abradable layer fixed to the second surface.

\* \* \* \* \*

UNITED STATES PATENT AND TRADEMARK OFFICE
CERTIFICATE OF CORRECTION

PATENT NO. : 12,071,858 B2
APPLICATION NO. : 17/543347
DATED : August 27, 2024
INVENTOR(S) : Singhal et al.

It is certified that error appears in the above-identified patent and that said Letters Patent is hereby corrected as shown below:

In the Claims

In Column 19, Claim 9, Line 40, delete ""filler"".

Signed and Sealed this
Twenty-second Day of October, 2024

Katherine Kelly Vidal
*Director of the United States Patent and Trademark Office*